(12) United States Patent
Van Dalfsen et al.

(10) Patent No.: US 6,639,605 B2
(45) Date of Patent: Oct. 28, 2003

(54) METHOD OF AND UNIT FOR DISPLAYING AN IMAGE IN SUB-FIELDS

(75) Inventors: Age Jochem Van Dalfsen, Eindhoven (NL); Marinus Van Splunter, Helmond (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 392 days.

(21) Appl. No.: 09/725,416

(22) Filed: Nov. 29, 2000

(65) Prior Publication Data

US 2002/0008706 A1 Jan. 24, 2002

(30) Foreign Application Priority Data

Dec. 17, 1999 (EP) .............................. 99204493

(51) Int. Cl.$^7$ ................................. G09G 5/10
(52) U.S. Cl. ..................... 345/690; 345/63; 345/72; 345/88; 345/89
(58) Field of Search ............... 345/60, 63, 72, 345/87–89, 589, 591, 597–601, 690–693

(56) References Cited

U.S. PATENT DOCUMENTS

| | | | | |
|---|---|---|---|---|
| 5,555,000 A | * | 9/1996 | Sarrasin et al. ................ | 345/75 |
| 5,841,413 A | | 11/1998 | Zhu et al. ..................... | 345/63 |
| 6,100,863 A | * | 8/2000 | Zhu ............................. | 345/89 |
| 6,323,880 B1 | * | 11/2001 | Yamada ....................... | 345/690 |
| 6,331,843 B1 | * | 12/2001 | Kasahara et al. .............. | 345/63 |
| 6,396,508 B1 | * | 5/2002 | Noecker ...................... | 345/693 |
| 6,411,268 B1 | * | 6/2002 | Nakamura et al. ............. | 345/60 |
| 6,414,657 B1 | * | 7/2002 | Kasahara et al. .............. | 345/63 |
| 2001/0005186 A1 | * | 6/2001 | Van Dalfsen et al. .......... | 345/60 |

FOREIGN PATENT DOCUMENTS

EP          0952569 A2     10/1999     ............. G09G/3/28

* cited by examiner

Primary Examiner—Bipin Shalwala
Assistant Examiner—Tommy Sheng
(74) Attorney, Agent, or Firm—Edward W. Goodman

(57) ABSTRACT

A display device (506) is driven in a number of sub-fields. Each of the sub-fields is for outputting a respective illumination level by the display device. In each sub-field, a pixel of the displayed image may emit an amount of light corresponding to the particular sub-field, depending on whether it is switched on or not. A required intensity level of the pixel is realized by selecting an appropriate combination of sub-fields in which the pixel is switched on. A selection is made from the possible intensity levels that can be generated by all possible combinations of sub-fields. The selected intensity levels are uniformly spaced on a perceptual scale, allowing a relatively small number of intensity levels for displaying an image with a relatively high perceived quality. The image display unit (300) has a the combinations of sub-fields for the respective selected intensity levels.

4 Claims, 2 Drawing Sheets

METHOD OF AND UNIT FOR DISPLAYING AN IMAGE IN SUB-FIELDS

BACKGROUND OF THE INVENTION

1. Field of the Invention

The invention relates to a method of displaying an image on a display device in a plurality of periods called sub-fields, wherein the display device is capable of generating in each of the sub-fields, a respective illumination level, the method comprising the steps of:

defining a set of combinations of sub-fields, each combination in the set corresponding with a respective illumination level of the display device;

for each pixel of the image, selecting from the set a particular combination of sub-fields, in conformance with the intensity value of the pixel; and for each pixel of the image sending a representation of the selected combination of sub-fields to the display device for displaying the particular pixel.

The invention further relates to an image display unit for displaying an image on a display device in a plurality of periods called sub-fields, wherein the display device is capable of generating, in each of the sub-fields, a respective illumination level, the image display unit comprising:

storing means for storing a set of combinations of sub-fields, each combination in the set corresponding with a respective illumination level of the display device;

selection means for selecting from the set, a particular combination of sub-fields in conformance with the intensity value of a particular pixel of the image, and sending means for sending a representation of the selected combination of sub-fields to the display device for displaying the particular pixel.

The invention further relates to an image display apparatus comprising such an image display unit.

2. Description of the Related Art

U.S. Pat. No. 5,841,413 describes a plasma display panel driven in a plurality of sub-fields. A plasma display panel is made up of a number of cells that can be switched on and switched off. A cell corresponds with a pixel (picture element) of the image that is to be displayed on the panel. In the operation of the plasma display panel, three phases can be distinguished. The first phase is the erasure phase in which the memories of all cells of the panel are erased. The second phase is the addressing phase, in which the cells of the panel that are to be switched on are conditioned by setting appropriate voltages on their electrodes. The third phase is the sustain phase, in which sustain pulses are applied to the cells which cause the addressed cells to emit light for the duration of the sustain phase. The plasma display panel emits light during this sustain phase. The three phases together are called a sub-field period or simply a sub-field. A single image, or frame, is displayed on the panel in a number of successive sub-field periods. A cell may be switched on for one or more of the sub-field periods. The light emitted by a cell in the sub-field periods in which it was switched on, is integrated in the eye of the viewer who perceives a corresponding intensity for that cell. In a particular sub-field period, the sustain phase is maintained for a particular time resulting in a particular illumination level of the activated cells. Typically, different sub-fields have a different duration of their sustain phase. A sub-field is given a coefficient of weight to express its contribution to the light emitted by the panel during the whole frame period. An example is a plasma display panel with 6 sub-fields having coefficients of weight of 1, 2, 4, 8, 16 and 32, respectively. By selecting the appropriate sub-fields in which a cell is switched on, 64 different intensity levels can be realized in displaying an image on this panel. The plasma display panel is then driven by using binary code words of 6 bits each, whereby a code word indicates the intensity level of a pixel in binary form.

The device described in U.S. Pat. No. 5,841,413 employs more sub-fields than necessary for realizing the required set of intensity values. The resulting set of code words for expressing the intensity value is redundant, i.e. for a given intensity value, more than one code word is available. From this redundant set a subset is created whereby those code words are selected that give the fewest differences in the most significant bit for expressing a difference between the intensity values. This subset is created by searching the original set and determining what the effect on the artifacts may be for a difference between a given code word and each of the other code words. The resulting sub-set contains all different intensity values that can be generated by the combinations of the available sub-fields.

SUMMARY OF THE INVENTION

It is an object of the invention to provide a method as described in the preamble with an improved processing of the intensity values. This object is achieved, according to the invention, in a method which is characterized in that the combinations of sub-fields in the set correspond with respective illumination levels that are uniformly spaced on a perceptual scale. By choosing the working set of intensity levels, which is the set of intensity levels that are available for displaying the image, in such a way that the intensity levels are uniformly spaced with regard to human perception, the number of different intensity levels may be substantially reduced while still being able to display the image with sufficient quality. This is caused by the fact that the sub-field driven display, like a plasma panel, has a linear relation between the video input and the luminance output, while a human has a perception curve that strongly differs from a linear relation. The human viewer is very susceptible for differences for low intensities and less susceptible differences for high intensity. Therefore, near the dark end of the scale, a relatively large number of intensity levels are required having small mutual luminance differences, whereas near the bright end of the scale, fewer intensity levels are required which may have a large mutual luminance differences. The known display device has intensity levels with fixed luminance differences between them. This results in a luminance resolution that is more finely spaced than necessary for the high intensity levels. The method according to the invention provides a relatively large number of different intensity levels for low intensity and a relatively small number of levels for high intensity. In total, the number of intensity levels according to the invention is much lower than the number of intensity levels according to the known method. This is advantageous since fewer levels need to be stored for processing the image and less computational effort is required.

Above, it has been described that the selection and distribution according to the invention allows a reduction of the number of intensity levels and that this reduction was realized by making a selection among all levels possible in the display device at hand. However, it is also possible to exploit the reduced number of required intensity levels by reducing the number of levels that the device can generate, e.g. by modifying the organization of the sub-fields.

In an embodiment of the method according to the invention wherein the respective illumination levels have a luminance substantially according to the function $L=x^\gamma$, wherein L is the output luminance, x is the number of the illumination level and $\gamma$ is a constant, such a function provides an easy approximation of a perceptual intensity scale.

In an embodiment of the method according to the invention wherein the value of $\gamma$ is approximately 2.3, this distribution of intensity levels corresponds to the inverse of the gamma filtering that is applied to video signals taken by a camera. When the levels of this distribution are directly used on the basis of the received video signals, the required gamma correction is intrinsically applied. Therefore, this embodiment does not require the separate step of inverse gamma filtering as applied in the known method.

In an embodiment of the method according to the invention wherein the combinations of sub-fields in the set are formed by sub-fields that are temporally close together compared to the total time of the plurality of sub-fields, by restricting the intensity levels that are used for displaying the image to those levels that are realized in sub-fields that follow each other in a short period of time, motion artifacts as described above are reduced. These artifacts may occur since in driving the display device, the frame period, i.e. the period between two successive images, is separated into a number of sub-field. During each of these sub-field periods a cell may or may not be switched on and integration over the sub-field periods results in a perceived intensity level of the pixel corresponding with this cell. Instead of displaying a pixel at a given moment in time, on a plasma display panel, the pixel is displayed as a series of sub-pixels shifted in time with respect to each other. This may cause artifacts if a series of images contains a moving object. The eyes of the viewer track the moving object, while the elements of the object emit light at various different moments. These temporal differences between parts of the object are translated to spatial differences by the eye tracking, resulting in artifacts like false contours. Another artifact is motion blur. This occurs if the intensity level of the pixels of a moving object are generated in a large number of sub-fields. It is then clearly noticeable that the light of a pixel has been emitted at the various different moments.

The motion of an object needs to be taken into account when displaying the object in a number of sub-fields. For each next sub-field, the object must be moved a little. Motion compensation techniques are used to calculate a corrected position for the sub-pixels in the sub-fields. In some circumstances, the motion compensation are not fully reliable and may produce erroneous results, e.g., in an area of the image with little detail. The erroneous results lead to motion compensation where this should not be done. This also gives motion artifacts which are very visible.

Now, in this embodiment, the light of a single pixel is emitted in a shorter period of time, which makes any possible motion during the emission shorter. Therefore, the light of a pixel is perceived to come from a single position, or at least from positions close together, thus resulting in a better picture with a smaller chance for artifacts.

In an embodiment of the method according to the invention wherein the combinations of sub-fields in the set are formed by 1 or 2 sub-fields that are temporally adjacent, by using only combinations of 1 or 2 sub-fields that are adjacent in time, it is possible to generate a suitable working set of illumination levels. This working set contains a sufficient number of illumination levels on the one hand, while on the other hand it is less sensitive to motion artifacts.

It is a further object of the invention to provide an image display unit as described in the preamble with an improved processing of the intensity values. This object is achieved according to the invention in an image display unit which is characterized in that the combinations of sub-fields in the set correspond with respective illumination levels that are uniformly spaced on a perceptual scale. These combinations allow the display of the image with a smaller number of different intensity levels, while maintaining the perceived quality of the image. This is caused by the fact that the distribution of the intensity levels according to the invention are adapted to human perception. The reduction of the number of intensity levels that needs to be employed is advantageous in view of storage and computational effort.

BRIEF DESCRIPTION OF THE DRAWINGS

The invention and its attendant advantages will be further elucidated with the aid of exemplary embodiments and the accompanying schematic drawings, wherein.

Corresponding features in the various Figures are denoted by the same reference symbols.

DESCRIPTION OF THE PREFERRED EMBODIMENT

Figure 1:
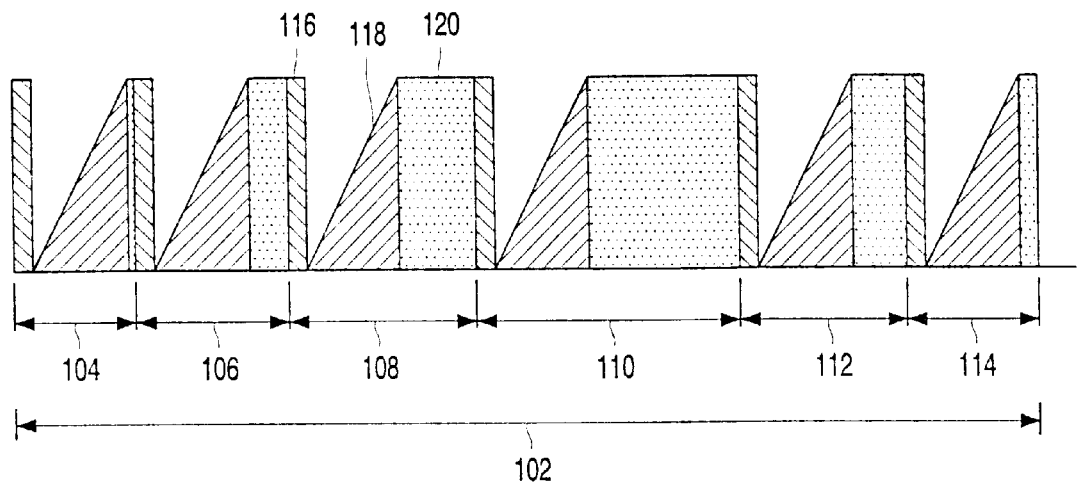
FIG. 1 schematically shows a field period with 6 sub-field.

FIG. 1 schematically shows a field period with 6 sub-fields. The field period 102, also called the frame period, is the period in which a single image or frame is displayed on the display panel. In this example, the field period 102 consists of 6 sub-fields indicated with references 104–114. In a sub-field, a cell of the display panel may be switched on in order to produce an amount of light. Each sub-field starts with an erasure phase in which the memories of all cells are erased. The next phase in the sub-field is the addressing phase in which the cells that are to be switched on for emitting light in this particular sub-field are conditioned. Then, in a third phase of the sub-field which is called the sustain phase, sustain pulses are applied to the cells. This causes the cells that have been addressed to emit light during the sustain phase. The organization of these phases is shown in FIG. 1, where time runs from left to right. For example, sub-field 108 has an erasure phase 116, an addressing phase 118 and a sustain phase 120. It is to be noted that in some panels, the sub-field ends with the erasure phase, rather than starting with it. However, this is of no significance to the invention which can be applied in either case.

The perceived intensity of a pixel of a displayed image is determined by controlling during which of the sub-fields the cell corresponding to the pixel is switched on. The light emitted during the various sub-fields in which a cell is switched on is integrated in the eyes of the viewer, thus resulting in a certain intensity of the corresponding pixel. A sub-field has a coefficient of weight indicating its relative contribution to the emitted light. An example is a plasma display panel with 6 sub-fields having coefficients of weight of 1, 2, 4, 8, 16 and 32, respectively. By selecting the appropriate combination of sub-fields in which a cell is switched on, 64 different intensity levels can be realized in displaying an image on this panel. The plasma display panel is then driven by using binary code words of 6 bits each, whereby a code word indicates the intensity level of a pixel in binary form.

A particular realization of the invention uses a plasma display panel that is driven in ten sub-fields. The following Table I shows how the working set of intensity levels is selected from all possible combinations of these sub-fields.

TABLE I

Selected intensity levels

| level | sb-fld | | | | | | | | | |
|---|---|---|---|---|---|---|---|---|---|---|
| | 1 | 2 | 3 | 4 | 5 | 6 | 7 | 8 | 9 | 10 |
| 0 | | | | | | | | | | |
| 1 | x | | | | | | | | | |
| 2 | | x | | | | | | | | |
| 3 | x | x | | | | | | | | |
| 4 | | | x | | | | | | | |
| 5 | | x | x | | | | | | | |
| 6 | | | | x | | | | | | |
| 7 | | | x | x | | | | | | |
| 8 | | | | | x | | | | | |
| 9 | | | | x | x | | | | | |
| 10 | | | | | | x | | | | |
| 11 | | | | | x | x | | | | |
| 12 | | | | | | | x | | | |
| 13 | | | | | | x | x | | | |
| 14 | | | | | | | | x | | |
| 15 | | | | | | | x | x | | |
| 16 | | | | | | | | | x | |
| 17 | | | | | | | | x | x | |
| 18 | | | | | | | | | | x |
| 19 | | | | | | | | | x | x |

The first line of the table contains the references for the ten different sub-fields. The first column contains the codes referring to the intensity levels that are selected in this example. The table indicates through 'x'-marks, by which sub-field or combination of sub-fields a particular intensity level is generated. For example, intensity level 6 is generated by switching on sub-field 4 and intensity level 7 is generated by switching on sub-fields 3 and 4. The table shows that each intensity level is generated by one single sub-field or by a combination of two adjacent sub-fields. This is a particular possibility to use levels that can be generated by sub-fields that are temporally close together according to the invention. Other selections than the one shown in Table I are possible, e.g., a selection were the intensity levels are generated by combinations of 1, 2 or 3 adjacent sub-fields.

The number of intensity levels has been significantly reduced compared with the 1024 levels that could be realized with ten sub-fields with a binary distribution of the coefficients of weight. To use the number of levels as efficient as possible, in particular, to display the gray scales of an image as good as possible, the levels have been selected uniformly on a perceptual scale. This means that the perceived luminance difference between any two intensity levels is roughly the same. Then, the different levels are close to each other for low intensity levels, i.e., dark areas of an image, and further apart for high intensity levels, i.e., the bright areas of an image. So, this is advantageous regarding the perception of the human viewer, who can see smaller luminance differences in low intensity areas than in high intensity areas.

An example of a perceptual scale is the one that has been adopted by the CIE (Commission Internationale de l' Éclairage) as standard function. This function L* (L-star) is defined as follows:

$$L^* = \begin{cases} 903.3 \frac{L}{L_n}, & \frac{L}{L_n} \leq 0.008856 \\ 116\left(\frac{L}{L_n}\right)^{\frac{1}{3}} - 16, & 0.008856 < \frac{L}{L_n} \end{cases} \quad (1)$$

Wherein:

L is the luminance $L_n$ is the luminance of the white reference

L* is the perceived luminance, also called lightness.

A particular advantageous distribution of the intensity levels is to position the levels on a so-called gamma correction curve. Video signals produced by a camera are passed through a gamma filter. Therefore, incoming video signals that are to be displayed need to be gamma corrected using an inverse filter. Now, a CRT (cathode ray tube) intrinsically has such filtering, because the relation between luminance output and video signal voltage input is approximately a gamma correction curve. A plasma display panel however has a linear relation between the luminance output and the video input. Therefore, a system for displaying an image on a plasma display panel need a gamma correction filter, see for instance block 102 in FIG. 1A of U.S. Pat. No. 5,841,413. Now, by positioning the selected levels on a gamma correction curve, the gamma correction is applied by directly using the defined levels and the explicit step of gamma correction can be avoided. The gamma correction curve is given by the following formula:

$$L = x^\gamma \quad (2)$$

Wherein:

L is the output luminance x is the number of the intensity level

γ is a constant with value of 2.3

Given the pattern of selection of sub-fields, either as in Table I or in another pattern, the desired value of the intensity of the various levels can be chosen by an appropriate choice of the coefficients of weight of the respective sub-fields. In an experimental embodiment, the coefficients of weight as given in the following Table II have produced satisfactory results.

TABLE II

Coefficients of weight for the sub-fields

| Sub-field | Coefficient |
|---|---|
| 1 | 1 |
| 2 | 5 |
| 3 | 15 |
| 4 | 30 |
| 5 | 53 |
| 6 | 84 |
| 7 | 123 |
| 8 | 172 |
| 9 | 231 |
| 10 | 300 |

Figure 2:
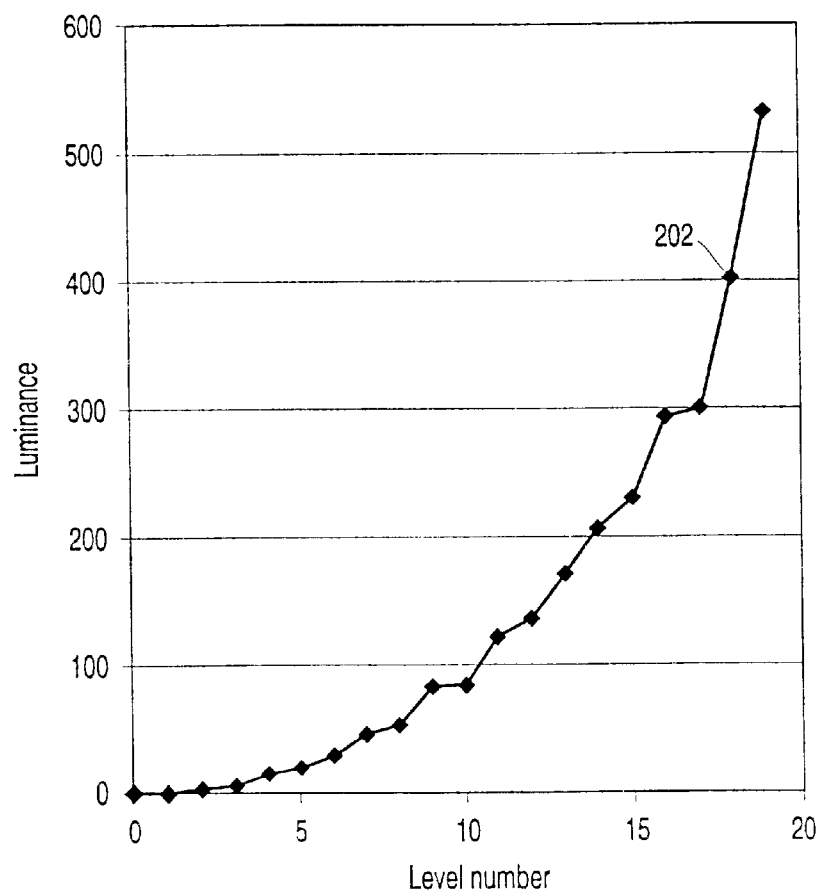
FIG. 2 graphically shows an example of the intensity levels selected according to the invention, FIG. 3 schematically shows an image display unit according to the invention, FIG. 4 schematically shows an alternative image display unit according to the invention.

FIG. 2 graphically shows an example of the intensity levels selected according to the invention. The levels can be generated by the selection of sub-fields according to Table I, wherein the coefficients of weight according to Table II are used. The horizontal axis indicates the available levels and the vertical axis the luminance. The marks indicate the luminance of the particular level, e.g., mark 202 indicates that level number 19 has a luminance of 403. The graph approximates the gamma correction curve. Another choice of the coefficients of weight for one or more sub-fields will result in a different graph.

The above embodiment has 20 intensity levels available to display a pixel. To simulate the display of an image with a higher number of levels, a technique called error diffusion can be applied. Error diffusion is a serial process which proceeds as follows: at each pixel, the desired level is rounded to the nearest quantization level, which is the output. The error is computed by subtracting the quantized value from the desired value. This error is 'diffused' by adding fractions of it to the desired values of nearby unquantized pixels. The precise pattern of how the error is distributed determines the resulting patterns in the image. Error diffusion is well known technique and is for instance described in the article of R. W. Floyd and L. Steinberg, called 'Adaptive algorithm for spatial grey scale', SID Int. Sym. Dig. Tech. Papers, pp. 36–37, 1975. Techniques other than error diffusion may be used to improve the perceived number of gray levels.

The embodiment above includes a set of 20 different intensity levels for displaying an image. The invention allows the usage of a set with another number of intensity levels. This can for instance be realized by allowing the combinations of more than two sub-fields. Then, more levels can be generated than shown in Table I. Alternatively, a panel can be used that can be operated in more than 10 sub-fields.

Figure 3:
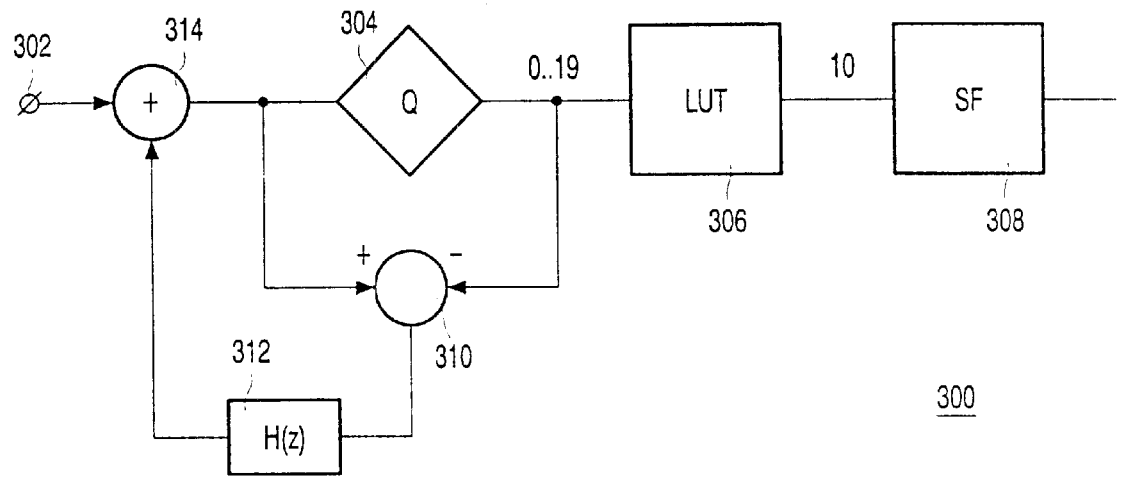

FIG. 3 schematically shows an image display unit according to the invention. A stream of pixels is received at input 302 and quantized by quantizer 304. The quantizer maps the intensity value of the received pixel to the intensity level that is nearest in intensity. In this embodiment, the pixel is mapped to one of the 20 available intensity levels. The image display unit has a look-up table 306 containing the available levels and specifying what combinations of the ten available sub-fields are to be used for the respective levels. Subsequently, the information as to what sub-fields are to be used for the pixels of the image is sent to addressing unit 308. This unit controls the switching of the cell during the various sub-fields when displaying image. As described above, error diffusion may be used to improve the perceived quality of the displayed image. To this end, the image display unit may include the following further elements. The original value of the intensity of the pixel is compared with the value after the quantization step in comparing unit 310. The difference between the two values, which is the error originating from the quantization, is fed to error filter 312. The output of the filter is added to the value of one or more following pixels, depending on the nature of the filter, by adder 314.

Figure 4:
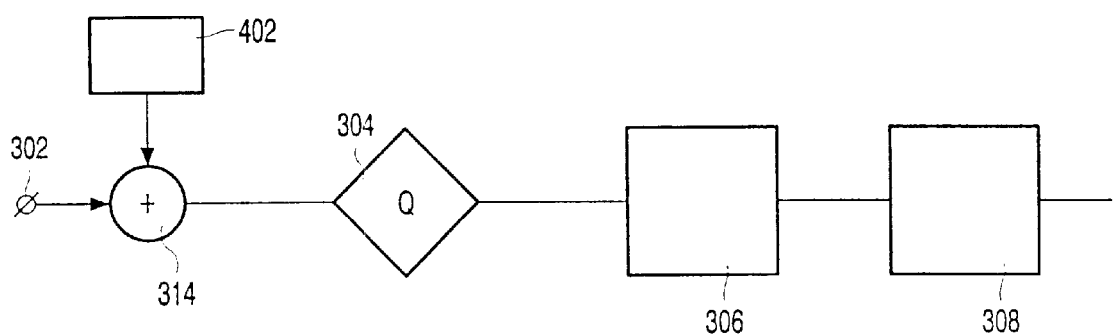

FIG. 4 schematically shows an alternative image display unit according to the invention. In this embodiment, the error diffusion is replaced by a very simple alternative. The image display unit 400 has a generator unit 402 generating a stochastic signal. This can be based on a pseudo random generator. The stochastic signal is added to the value of the pixel by adder 314. This masks the effect of the reduced number of gray levels in a very simple way.

Figure 5:
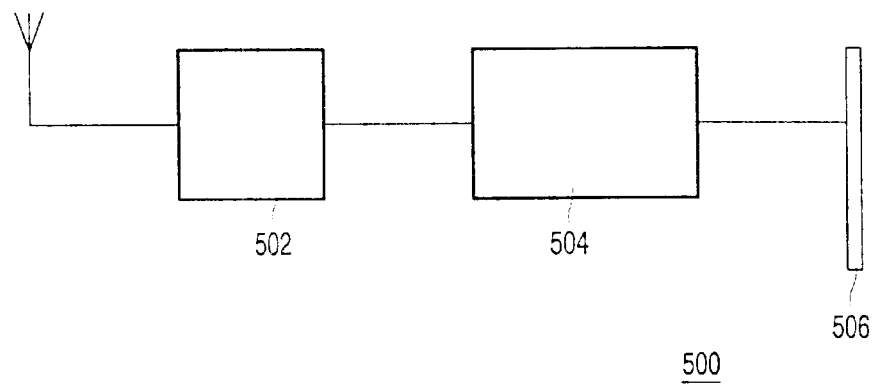
FIG. 5 shows the most important elements of an image display apparatus according to the invention.

FIG. 5 shows the most important elements of an image display apparatus according to the invention. The image display apparatus 500 has a receiving means 502 for receiving a signal representing the image to be displayed. This signal may be a broadcast signal received via an antenna or cable, but may also be a signal from a storage device like a VCR (Video Cassette Recorder). The image display apparatus 500 further has an image display unit 504 for processing the image and a display device 506 for displaying the processed image. The display device 506 is of a type that is driven in sub-fields. The image display unit may be implemented as described in connection with FIG. 3 or FIG. 4.

The invention has been described for an image composed of pixels each having a certain intensity level. The invention can be applied to black and white images and to color images. In a color image, a pixel has a separate intensity level for each color that is used. The selection of the combinations of sub-fields according to the invention may then carried out for each of the colors independently.

It should be noted that the above-mentioned embodiments illustrate rather than limit the invention and that those skilled in the art will be able to design many alternative embodiments without departing from the scope of the appended claims. The word 'comprising' does not exclude the presence of elements or steps other than those listed in a claim. The word "a" or "an" preceding an element does not exclude the presence of a plurality of such elements. The invention can be implemented by means of hardware comprising several distinct elements and by means of a suitably programmed computer. In the unit claims enumerating several means, several of these means can be embodied by one and the same item of hardware.

What is claimed is:

1. A method of displaying an image on a display device in a plurality of periods called sub-fields, wherein the display device is capable of generating, in each of the sub-fields, a respective illumination level, the method comprising the steps:

defining a set of combinations of sub-fields, each combination in the set corresponding with a respective intensity level of the display device;

for each pixel of the image, selecting a particular combination of sub-fields from the set in conformance with the intensity value of the pixel; and for each pixel of the image, sending a representation of the selected combination of sub-fields to the display device for displaying the particular pixel, characterized in that the combinations of sub-fields in the set correspond with respective intensity levels that are uniformly spaced on a perceptual scale, wherein the combinations of sub-fields in the set are formed by sub-fields that are temporally adjacent.

2. A method of displaying an image on a display device in a plurality of periods called sub-fields, wherein the display device is capable of generating, in each of the sub-fields, a respective illumination level, the method comprising the steps:

defining a set of combinations of sub-fields, each combination in the set corresponding with a respective intensity level of the display device;

for each pixel of the image, selecting a particular combination of sub-fields from the set in conformance with the intensity value of the pixel; and for each pixel of the image, sending a representation of the selected combination of sub-fields to the display device for displaying the particular pixel, characterized in that the combinations of sub-fields in the set correspond with respective intensity levels that are uniformly spaced on a perceptual scale, wherein the combinations of sub-fields in the set are formed by 1 or 2 sub-fields that are temporally adjacent.

3. An image display unit for displaying an image on a display device in a plurality of periods called sub-fields, wherein the display device is capable of generating, in each of the sub-fields, a respective illumination level, the image display unit comprising:

storing means for storing a set of combinations of sub-fields, each combination in the set corresponding with a respective illumination level of the display device;

selection means for selecting a particular combination of sub-fields from the set in conformance with the intensity value of a particular pixel of the image; and sending means for sending a representation of the selected combination of sub-fields to the display device for displaying the particular pixel, characterized in that the combinations of sub-fields in the set correspond with respective illumination levels that are uniformly spaced on a perceptual scale, wherein the combinations of sub-fields in the set are formed by sub-fields that are temporally adjacent.

4. An image display unit for displaying an image on a display device in a plurality of periods called sub-fields, wherein the display device is capable of generating, in each of the sub-fields, a respective illumination level, the image display unit comprising:

storing means for storing a set of combinations of sub-fields, each combination in the set corresponding with a respective illumination level of the display device;

selection means for selecting a particular combination of sub-fields from the set in conformance with the intensity value of a particular pixel of the image; and sending means for sending a representation of the selected combination of sub-fields to the display device for displaying the particular pixel, characterized in that the combinations of sub-fields in the set correspond with respective illumination levels that are uniformly spaced on a perceptual scale, wherein the combinations of sub-fields in the set are formed by 1 or 2 sub-fields that are temporally adjacent.

* * * * *